Patented Sept. 27, 1949

2,482,948

UNITED STATES PATENT OFFICE 2,482,948

METHOD FOR THE PRODUCTION OF COLUMBIUM CONTAINING STEEL

Charles Sykes, Sheffield, England, and Charles William Wright, deceased, late of Sheffield, England, by Doris Wright, executrix, Sheffield, England, assignors to Thos. Firth & John Brown Limited, Sheffield, England, a British company No Drawing. Application December 19, 1947, Serial No. 792,858. In Great Britain November 11, 1946

Section 1, Public Law 690, August 8, 1946

7 Claims. (Cl. 75—129)

This invention relates to the production of columbium containing steel and more particularly to the production of columbium containing steel by the direct use of columbium bearing ore.

The invention is based on the discovery that a satisfactory columbium containing steel may be produced by adding columbium ore (e. g. columbite containing over 50% $Cb_2O_5$ with a relatively small proportion, say 15%, of $Ta_2O_5$ along with minor quantities of other reducible oxides such as FeO and MnO) together with a reducing agent to a steel base before refining and is thereby distinguished from a previous proposal in which columbium ore is to be added to a finishing slag employed to refine a bath of stainless steel. The reduction of the columbium ore at an early stage in the steel producing process is moreover advantageous in that the various oxidised products, and other products of the reduction which are not desired to remain in the steel, have a better opportunity of getting out of the melt, and consequently the finished steel tends to be cleaner, than when the reduction of the columbium ore occurs at a late stage in the steel producing process.

The invention accordingly consists in a process for the direct production of a columbium containing steel which is characterized by the steps of adding columbium bearing ore and a reducing agent in the solid state to a steel base before melting of the base is completed and then heating the mixture to melt the base and to reduce the ore.

The reduction is suitably carried out in a basic lined induction steel making furnace, e. g. a high frequency furnace.

The base employed may consist of virgin steel or weekly alloyed scrap in which some of the elements desired in the finished product or in the reducing agents are present, or highly alloyed scrap, e. g. of the stainless varieties of steel especially the austenitic series which may contain titanium, columbium or zirconium singly or together.

The reducing agents employed may be titanium, zirconium, calcium, aluminium and silicon. It is, however, preferred to use ferro-silicon as the reducing agent. Advantage may also be taken of the fact that some varieties of stainless steel scraps contain titanium which is usefully employed in the process to assist in the reduction of the columbium ore. Care should be taken to ensure that if titanium is present the reducing value of this element is not lost by atmospheric oxidation.

It is found that when silicon is used as the reducing agent the amount left in the steel after the reaction may normally be kept within the limits specified for the steel being produced.

The following example illustrates the invention when austenitic titanium steel scrap is employed, the added reducing agent being ferro-silicon in addition to the contained titanium and silicon in the scrap. The reduction in this example was carried out in a basic lined induction furnace.

1. Charged part of the following mixture:
    69 lbs. 18/8 titanium bearing scrap.
    10 lbs. .05% steel scrap.
    1½ lbs. nickel and 2 lbs. lime.
2. Current switched on.
3. As soon as melting commenced, 1½ lbs. FeSi added, followed immediately with 2 lbs. of columbite having the following analysis:

|  | Per cent |
|---|---|
| Carbon | 0.07 |
| Manganous oxide | 7.09 |
| Ferrous oxide | 14.60 |
| Titania | 1.69 |
| Tantalum pentoxide | 14.70 |
| Columbium pentoxide | 57.00 |

4. Rest of item 1 as melting progressed.
5. 4½ lbs. ferro-chromium added.
6. Complete fusion.
7. Temperature adjusted and tapped.
8. Total time about 30 minutes.

The product analysed:

| C | Si | Mn | Cr | Ni | Ti | Al | Cb | Ta |
|---|---|---|---|---|---|---|---|---|
| .09 | .45 | .64 | 17.6 | 8.9 | .02 | nil | .77 | .15 |

The yield of Cb+Ta, was 75.4%.

We claim:

1. A process for the direct production of a columbian containing steel which is characterized by the steps of adding columbium bearing ore and a reducing agent in the solid state to a steel base before melting of the base is completed and then heating the mixture to melt the base and to reduce the ore.

2. A process as claimed in claim 1 in which the steel base comprises a steel of the austenitic series containing titanium.

3. A process as claimed in claim 1 in which the reducing agent comprises one or more of the following: titanium, zirconium, calcium, aluminum and silicon.

4. A process as claimed in claim 1 in which the reducing agent is ferro-silicon.

5. A process as claimed in claim 1 in which the columbium bearing ore is columbite containing over 50 per cent $Cb_2O_5$ with a relatively small proportion of $Ta_2O_5$ and minor quantities of reducible oxides such as FeO and MnO.

6. A process as claimed in claim 1 in which the columbium bearing ore comprises columbite containing approximately 57 per cent $Cb_2O_5$ and approximately 15 per cent $Ta_2O_5$, together with minor quantities of other reducible oxides such as FeO and MnO.

7. A process as claimed in claim 1 in which the columbium ore and the reducing agent are added prior to the melting of the base.

CHARLES SYKES.
DORIS WRIGHT.
*Executrix of the estate of Charles William Wright, Deceased.*

REFERENCES CITED

The following references are of record in the file of this patent:

UNITED STATES PATENTS

| Number | Name | Date |
|---|---|---|
| 2,203,214 | Doom | June 4, 1940 |
| 2,256,901 | Hogard | Sept. 23, 1941 |
| 2,336,237 | Feild | Dec. 7, 1943 |